(12) United States Patent
Perenda et al.

(10) Patent No.: US 11,576,055 B2
(45) Date of Patent: Feb. 7, 2023

(54) METHOD, APPARATUS AND COMPUTER READABLE MEDIA FOR NETWORK OPTIMIZATION

(71) Applicant: Nokia Solutions and Networks Oy, Espoo (FI)

(72) Inventors: Erma Perenda, Shanghai (CN); Haris Gacanin, Antwerp (BE)

(73) Assignees: Nokia Shanghai Bell Co., Ltd., Shanghai (CN); Nokia Solutions and Networks Oy, Espoo (FI)

(*) Notice: Subject to any disclaimer, the term of this patent is extended or adjusted under 35 U.S.C. 154(b) by 36 days.

(21) Appl. No.: 17/253,903

(22) PCT Filed: Jun. 22, 2018

(86) PCT No.: PCT/CN2018/092412
§ 371 (c)(1),
(2) Date: Dec. 18, 2020

(87) PCT Pub. No.: WO2019/242004
PCT Pub. Date: Dec. 26, 2019

(65) Prior Publication Data
US 2021/0274362 A1      Sep. 2, 2021

(51) Int. Cl.
*H04W 4/00*         (2018.01)
*H04W 24/02*        (2009.01)
(Continued)

(52) U.S. Cl.
CPC .......... *H04W 24/02* (2013.01); *H04L 1/0017* (2013.01); *H04L 1/0026* (2013.01);
(Continued)

(58) Field of Classification Search
CPC ... H04W 24/02; H04W 28/04; H04W 72/085; H04W 84/12; H04W 88/08; H04W 88/12;
(Continued)

(56) References Cited

U.S. PATENT DOCUMENTS 7,835,301 B1 * 11/2010 Maufer ................. H04W 24/02
                                                        370/254
8,654,672 B1    2/2014 Nicholas et al.
(Continued)

FOREIGN PATENT DOCUMENTS

EP    3018856 A1 *  5/2016  .......... H04L 5/0058
EP    3157284 A1 *  4/2017  .......... H04B 17/336
(Continued)

OTHER PUBLICATIONS

Vanhatupa, Timo, et al., "Performance model for IEEE 802.11s wireless mesh network deployment design", Journal of Parallel and Distributed Computing, vol. 68, Issue 3, Mar. 2008, abstract only.

*Primary Examiner* — Phuongchau Ba Nguyen
(74) *Attorney, Agent, or Firm* — Harrington & Smith (57) ABSTRACT

Embodiments of the present disclosure relate to methods, apparatuses and computer program products for network optimization in a wireless network. A method includes determining a plurality of communication performance metrics associated with a plurality of access points; determining, based on the plurality of communication performance metrics, a plurality of communication performance problems to be solved for the plurality of access points; determining, from a predetermined set of optimization strategies, an optimization strategy for an access point of the plurality of access points based on the plurality of communication performance problems; and causing the access point to apply the determined optimization strategy.

12 Claims, 6 Drawing Sheets

(51) Int. Cl.
  *H04L 1/00* (2006.01)
  *H04L 41/0654* (2022.01)
  *H04L 41/069* (2022.01)
  *H04L 43/0829* (2022.01)
  *H04L 43/0852* (2022.01)
  *H04L 43/0876* (2022.01)
  *H04W 28/04* (2009.01)
  *H04W 72/08* (2009.01)

(52) U.S. Cl.
  CPC ........ *H04L 41/069* (2013.01); *H04L 41/0672* (2013.01); *H04L 43/0829* (2013.01); *H04L 43/0852* (2013.01); *H04L 43/0876* (2013.01); *H04W 28/04* (2013.01); *H04W 72/085* (2013.01)

(58) Field of Classification Search
  CPC .. H04W 72/04; H04W 72/042; H04L 1/0017; H04L 1/0026; H04L 41/0672; H04L 41/069; H04L 43/0829; H04L 43/0852; H04L 43/0876; H04L 5/0007
  See application file for complete search history.

(56) References Cited

U.S. PATENT DOCUMENTS

| | | | | |
|---|---|---|---|---|
| 9,538,463 | B2* | 1/2017 | Chen | H04W 48/20 |
| 10,244,541 | B2* | 3/2019 | Gokturk | H04W 72/0446 |
| 2004/0039817 | A1* | 2/2004 | Lee | H04W 24/00 709/225 |
| 2004/0047323 | A1* | 3/2004 | Park | H04W 48/18 370/338 |
| 2004/0106379 | A1* | 6/2004 | Zen | H04W 48/20 455/426.2 |
| 2006/0176849 | A1* | 8/2006 | Gass | H04W 64/00 370/328 |
| 2007/0054645 | A1* | 3/2007 | Pan | H04W 24/08 455/266 |
| 2011/0158127 | A1* | 6/2011 | Duo | H04W 48/16 370/254 |
| 2011/0216692 | A1* | 9/2011 | Lundsgaard | H04W 48/20 370/328 |
| 2013/0077505 | A1* | 3/2013 | Choudhary | H04W 48/14 370/252 |
| 2013/0329619 | A1 | 12/2013 | Carty et al. | 370/311 |
| 2015/0304983 | A1* | 10/2015 | Krening | H04B 17/318 370/254 |
| 2016/0205697 | A1 | 7/2016 | Tan et al. | 84/18 |
| 2017/0094693 | A1* | 3/2017 | Law | H04W 8/005 |
| 2017/0272963 | A1 | 9/2017 | Rengarajan et al. | |
| 2017/0359735 | A1 | 12/2017 | Jain et al. | 24/2 |
| 2018/0069771 | A1 | 3/2018 | Dade et al. | |
| 2020/0084777 | A1* | 3/2020 | Ergen | H04W 72/085 |

FOREIGN PATENT DOCUMENTS

| | | | | | |
|---|---|---|---|---|---|
| GB | | 2350976 | A * | 12/2000 | H04W 16/04 |
| WO | WO-2017/161260 | A2 | | 9/2017 | |

\* cited by examiner

FIG. 10 ial Stage application of International Patent Application Number PCT/CN2018/092412 filed Jun. 22, 2018, which is hereby incorporated by reference in its entirety.

METHOD, APPARATUS AND COMPUTER READABLE MEDIA FOR NETWORK OPTIMIZATION

CROSS REFERENCE TO RELATED APPLICATION

This patent application is a U.S. National Stage application of International Patent Application Number PCT/CN2018/092412 filed Jun. 22, 2018, which is hereby incorporated by reference in its entirety.

FIELD

Non-limiting and example embodiments of the present disclosure generally relate to a technical field of wireless communication, and specifically to methods, apparatuses and computer program products for network optimization in a wireless network.

BACKGROUND

This section introduces aspects that may facilitate better understanding of the disclosure. Accordingly, the statements of this section are to be read in this light and are not to be understood as admissions about what is in the prior art or what is not in the prior art.

Wireless Mesh Networks (WMNs) are being rapidly deployed into public, home and enterprise environments. Due to high density of deployment of wireless Access Points (APs), unmanaged dynamic environment and presence of non-Wi-Fi interference, WMNs may encounter significant performance degradation. To keep the network performance satisfactory, approaches for network optimization need to be developed.

SUMMARY

Various embodiments of the present disclosure mainly aim at providing methods, apparatuses and computer storage media for network optimization in a wireless network which includes a WMN or other networks where similar problems exist.

In a first aspect of the disclosure, there is provided a method implemented at a network device. The method comprises: determining a plurality of communication performance metrics associated with a plurality of access points; determining, based on the plurality of communication performance metrics, a plurality of communication performance problems to be solved for the plurality of access points; determining, from a predetermined set of optimization strategies, an optimization strategy for an access point of the plurality of access points based on the plurality of communication performance problems; and causing the access point to apply the determined optimization strategy.

In some embodiments, determining a plurality of communication performance metrics associated with the plurality of access points may comprise: determining a communication performance metric for each of active radio interface and active stations associated with the plurality of access points, based on raw network data obtained from the plurality of access points via sensing. In a further embodiment, the raw network data may include radio-interface level metrics for each of the active radio interfaces associated with the plurality of access points, and station level statistics for each of the active stations associated with the plurality of access points.

In some embodiments, the radio-interface level metrics may include one of more of: a service set identifier, a channel index, a channel bandwidth, a type of a backhaul, a role of an associated access point, and statistic information of a channel.

In some embodiments, the station level statistics may include one of more of: total number of packets received, total number of packets transmitted, total amount of data transmitted or received, total number of retries, total number of failed packets, received signal strength indicator and a media access control address.

In some embodiments, determining a plurality of communication performance metrics may comprises determining a key performance indicator including one or more of: channel utilization; an activity factor; a retry rate; a packet error rate; a received signal strength indicator (RSSI); and an end to end user goodput. In a further embodiment, determining the key performance indicator may comprise determining the key performance indicator based on two successive sensing results.

In some embodiments, determining the plurality of communication performance problems to be solved for the plurality of access points may comprise: detecting communication performance problems for respective active radio interfaces associated with the plurality of access points based on at least one of: average channel utilization; the number of active terminal devices associated with a radio interface; the number of active access points associated with a radio interface; the number of terminal devices associated with a poor received signal strength indicator; the number of access points associated with a poor received signal strength indicator; the number of terminal devices associated with a good received signal strength indicator, a high error rate and a high retry rate; and the number of access points associated with a good received signal strength indicator, a high error rate and a high retry rate. In some embodiments, determining the communication performance problem may comprise: increase the number of detected communication performance problem by one, in response to one of: the average channel utilization being higher than a predetermined utilization threshold; an average received signal strength indicator associated with a terminal device or an access point being lower than a predetermined strength threshold; and an average received signal strength indicator associated with a terminal device or an access point being higher than the predetermined strength threshold, an average error rate associated with the terminal device or the access point being higher than a predetermined rate threshold and an average retry rate associated with the terminal device or the access point being higher than a predetermined retry threshold.

In some embodiments, determining an optimization strategy for an access point of the plurality of access points based on the plurality of communication performance problems may comprise: determining a priority for solving each of the detected communication performance problems; and based on the determined priority, determining an optimization strategy to be applied by an access point of the plurality of access points for solving a detected communication performance problem. In some embodiments, determining the priority may comprise: ranking the plurality of access points based on total traffic load associated with each of the plurality of access points; and determining the priority for solving a communication performance problem based on the ranking of the plurality of access points. In a further embodiment, determining the priority for solving a communication performance problem based on the ranking of the plurality of access points may comprise: determining a communication performance problem associated with an access point of the plurality of access points with the highest rank as a communication performance problem to be solved with the highest priority.

In some embodiments, determining the optimization strategy to be applied by an access point for solving a detected communication performance problem may comprise: for the detected communication performance problem, calculating a reward for each of the predetermined set of optimization strategies; and determining an optimization strategy with the highest reward, from the predetermined set of optimization strategies, for solving the detected communication performance problem. In some embodiments, calculating the reward may comprise calculating a sum of end to end goodput.

In some embodiments, causing the access point to apply the determined optimization strategy may comprise: determining an optimization action to be executed by the access point to apply the optimization strategy; and causing the access point to execute the determined optimization action.

In some embodiments, causing the access point to execute the determined optimization action may comprise: evaluating applicability of the determined optimization action; and in response to the optimization action being evaluated as applicable, causing the access point to execute the determined optimization action. In some embodiments, the method may further comprise: in response to the optimization action being evaluated as inapplicable, determining a further optimization strategy for the access point for solving the communication performance problem.

In some embodiments, the wireless network may include a wireless mesh network, and the access point may include a mesh point.

In a second aspect of the present disclosure, there is provided a network device. The network device comprises at least one processor; and at least one memory including computer program codes; the at least one memory and the computer program codes are configured to, with the at least one processor, cause the terminal device at least to: determine a plurality of communication performance metrics associated with a plurality of access points; determine, based on the plurality of communication performance metrics, a plurality of communication performance problems to be solved for the plurality of access points; determine an optimization strategy for an access point of the plurality of access points based on the plurality of communication performance problems, from a predetermined set of optimization strategies; and cause the access point to apply the determined optimization strategy.

In a third aspect of the present disclosure, there is provided an apparatus for communication. The apparatus comprises means for determining a plurality of communication performance metrics associated with a plurality of access points, means for determining, based on the plurality of communication performance metrics, a plurality of communication performance problems to be solved for the plurality of access points, means for determining an optimization strategy for an access point of the plurality of access points based on the plurality of communication performance problems, from a predetermined set of optimization strategies, and means for causing the access point to apply the determined optimization strategy.

In a fourth aspect of the disclosure, there is provided a computer program. The computer program comprises instructions which, when executed by an apparatus, causes the apparatus to carry out the method according to the first aspect of the present disclosure.

In a fifth aspect of the disclosure, there is provided a computer readable medium with a computer program stored thereon which, when executed by an apparatus, causes the apparatus to carry out the method of the first aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), WMN and so on. The "wireless network" may also be referred to as a "wireless communication network" or a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a network via which a terminal device accesses the network and receives services therefrom. The network device may refer to a mesh gateway (MG), a network controller, or an access point (AP), for example, a mesh point (MP), a base station (BS), a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. The "network device" may also be provided by a cloud.

The term "terminal device" refers to any end device that may be capable of wireless communications. By way of example rather than limitation, a terminal device may also be referred to as a communication device, a user device, user equipment (UE), a station (STA), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, and an uplink (UL) transmission refers to a transmission in an opposite direction.

Figure 1:
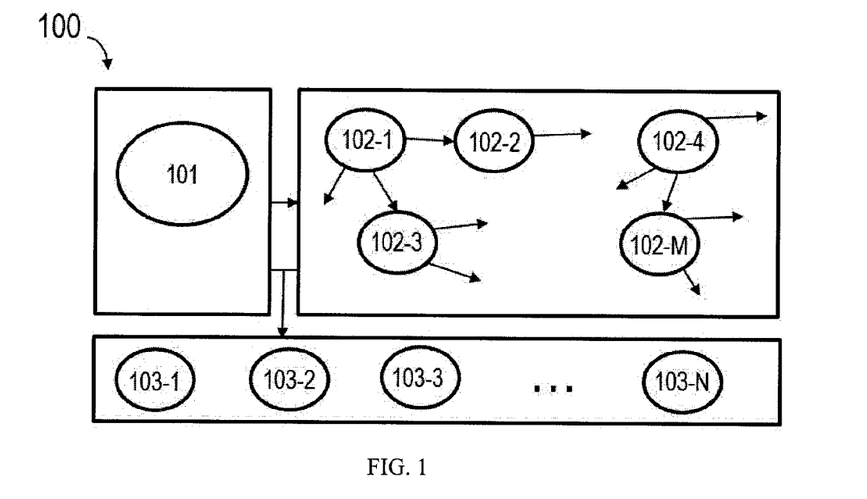
FIG. 1 illustrates an example communication network in which embodiments of the present disclosure may be implemented.

FIG. 1 illustrates an example wireless mesh network (WMN) 100 in which embodiments of the present disclosure may be implemented. As shown, the WMN 100 may include one or more network devices, for example, a MG 101, a plurality of mesh points MP 102-1, 102-2, . . . 102-M which may be collectively referred to as "MP 102" and one or more terminal devices 103-1, 103-2, . . . 103-N which may be collectively referred to as "terminal device 103". A MP 102 may be considered as an access point which doesn't have a direct connection to an external network (e.g., the Internet), while the MG 101 may be considered as a special MP which has a connection/gate to the external network. Therefore, the MP 102 may connect to the external network via the MG 101. Each MP 102 may have one or more radio interfaces (denoted as arrows in FIG. 1) and may communicate with one or more terminal devices 103. The terminal device 103 may connect to the MG 101 directly or indirectly via the MP 102.

Due to high density of deployment of wireless MPs/APs, unmanaged dynamic environment and presence of non-Wi-Fi interference, a WMN may encounter significant performance degradation. For example, communication in the WMN may be interfered by neighboring WMNs and/or non-Wi-Fi interference sources (e.g. radars, microwave oven, baby monitors and etc.). Therefore, to keep the network performance satisfactory, methods for network optimization need to be developed.

Several types of optimization methods have been considered in the WMN. These methods may be classified into two different approaches, i.e., independent optimization and joint optimization.

Each independent optimization method addresses a particular problem in WMN, for example, channel optimization, routing optimization, roaming, band-steering, location optimization, etc.

In contrast, a joint optimization method takes two or more independent optimizations and tries to find the best combination of optimization solutions that solve a certain problem. For example, a method for joint capacity and location optimization is proposed by Vanhatupa Timo et al. in a conference paper titled "Genetic algorithm to optimize node placement and configuration for WLAN planning" which is published in IEEE ISWCS, 2007, and in a paper titled "Minimum AP placement for WLAN with rate adaptation using physical interference model" which is published in IEEE GLOBECOM, 2010 by Zheng Zhongming, et al. A method for joint topology and channel optimization is proposed by A. U. Chaudhry et al. in a paper titled "Improving throughput and fairness by improved channel assignment using topology control based on power control for multi-radio multichannel wireless mesh networks." Although the independent optimizations are coupled together in the proposed joint optimization method to solve a certain problem, it is still possible that one problem can be solved by different joint optimizations. In addition, due to the computational complexity and non-polynomial hardness of most joint optimization methods, it is impossible to gather all problems in WMNs and to consider them by one joint optimization.

In addition, currently, various optimization methods are mostly treated independently and implemented in a product as different independent processes running in parallel.

Inventors of the present disclosure have observed that solving problems in a WMN may require contradictory optimization requirements at the same time instant leading to a ping-pong effect and consequently to poor performance. In addition, a particular problem may be solved by a plurality of candidate methods. For instance, poor performance of one user, may be solved by channel optimization, roaming to other AP or band-steering to other band of the same AP to which the user is associated already. In such a case, selecting a proper solution, or in other words a proper optimization strategy, with a minimal cost is desired.

In view of the above, a more advanced optimization solution needs to be developed considering dynamic aspects of environment. Furthermore, it may be very important to have a central control that intelligently detects and relates a particular problem to a relevant optimization method/strategy having the highest likelihood to solve the problem with minimal cost per network performance.

Expert systems are often used for problem solving in different fields (e.g. medicine, informatics, etc.). One example of the expert system is given in a paper titled "An Expert System based Novel Framework to Detect and Solve the Problems in Home Appliances by Using Wireless Sensors" which is published in the 1st International conference on futuristic trend in computational analysis and knowledge management, 2015 by Y. S. Patel et al. In this paper, an expert system based framework to detect and solve problems in home appliances by using wireless sensors is proposed. This framework relies on rule-based learning and interaction with human experts. The knowledge is represented in the form of facts and rules. The expert systems communicate with human experts when a new problem is observed and the solution cannot be found in knowledge base and/or when existing solution doesn't solve the problem. Since the expert systems require the human beings to evaluate the goodness of a solution, they are not attractive in WMN. Currently, there is no any state-of-the-art autonomous reasoning framework which controls mapping of a problem to an optimization method in the WMN.

In the present disclosure, an autonomous argumentative based reasoning framework, modelled similar as human brain, is proposed for addressing a problem-to-optimization search mapping in WMN. However, it should be appreciated that the proposed framework also applies to other communication networks where similar problems exist.

Figure 2:
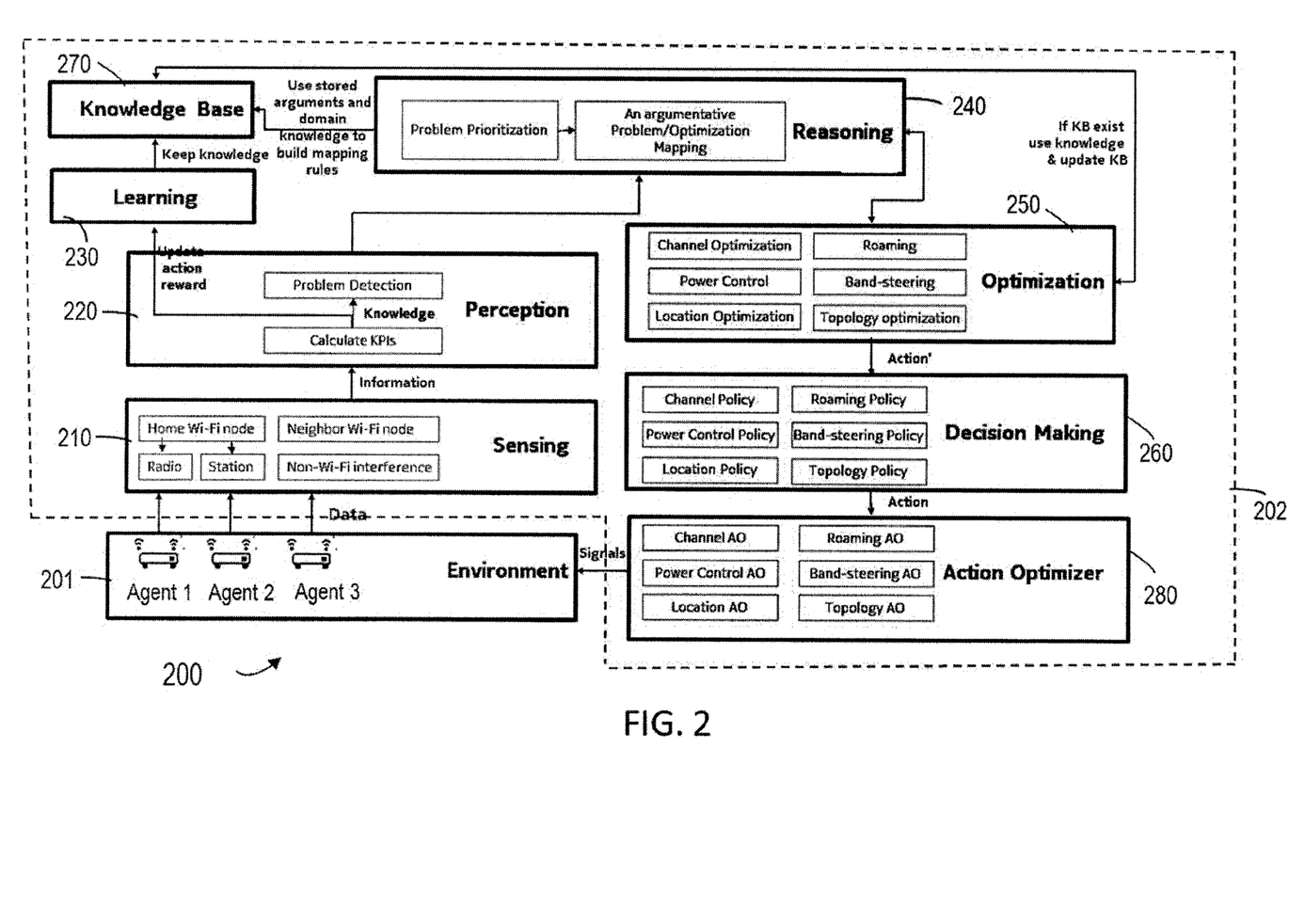
FIG. 2 shows a conceptual architecture of a framework for network optimization according to an embodiment of the present disclosure.

FIG. 2 shows a conceptual architecture of the proposed framework. As shown in FIG. 2, the WMN network 200 may be modelled as an environment 201 and an intelligent controller 202. The environment 201 may include a MG (e.g., MG 101 in FIG. 1), several MPs (e.g., MP 102 in FIG. 1), managed or non-managed neighboring WMNs and non-Wi-Fi interference sources (e.g. radars, microwave oven, baby monitors and etc.). MG is a mesh point which has a gate to Internet. Each MP may have an agent (e.g., agent 1, 2, 3 in FIG. 2) which is controlled by the intelligent controller 202. An agent includes an action executor which monitors commands from the intelligent controller 202, executes them and returns results back to the intelligent controller 202 if required.

The intelligent controller 202 may run on a MG (e.g., MG 101 in FIG. 1) or in the cloud. It treats jointly all optimization strategies (e.g., roaming, channel selection, handover, etc) and it selects, for a detected problem in the network, an optimization strategy candidate which has the highest likelihood to solve the network problem with the minimal cost.

As shown in FIG. 2, the intelligent controller 202 may include functions 210-260 for sensing, perception, learning, reasoning, optimization, and decision making respectively, and may include a Knowledge Base 270 and an Action Optimizer 280. It should be appreciated that in some embodiments, more than one function may be combined and performed by a single module, and/or, a single function may be implemented in a distribute way by more than one module of the intelligent controller 202.

The sensing function 210 may collect (e.g., periodically) raw network data from a plurality of mesh points or all mesh points in a WMN. The raw network data collected by the sensing function may include Radio-Interface level metrics and Station level statistics.

The Radio-Interface level metrics may be collected with zero-cost for each logical radio interface of each MP. This collected data may contain, for example, information about each logical radio interface (e.g., SSID, BSSID, assigned channel index and channel width, type of backhaul, role (MG or MP), etc.), and Clear Channel Assessment (CCA) statistics counters for currently used channels, e.g., channel busy time, channel transmitted time, channel received time, etc.

Station level statistics may include amount of data exchanged/failed, for example, total number of packets sent or received, total number of data bytes sent or received, total number of packets retries or failed, RSSI, MAC address, etc.

The sensing function may also be responsible for translating the received raw data into useful information, e.g., parsing the raw network data into known objects such as a station, a radio interface, a mesh point etc.

The perception function 220 in FIG. 2 may be considered as a thinking engine of the brain. Or, the perception function 220 may be considered as being similar to the sixth sense of human beings, supplementary to the five external sensations of the sensing function, which almost all cognitive life functions rely on. The perception function 220 may translate the sensing information to Key Performance Indicators (KPIs), which may be referred to as knowledge herein.

KPIs calculation may be done by the perception function 220 for each active radio and each active station in the WMN, and the calculation may be performed based on two successive sensing samples. A radio-level KPI may include channel utilization of a currently assigned channel and an activity factor which indicates how much the radio interface contributes to the channel utilization. A station level KPI may include a retry rate, an error rate, a Received Signal Strength Indicator (RSSI) and an E2E user goodput. The KPIs' values may be stored, for example, in the KB 270. To avoid temporal changes in the network, the perception function 220 may keep last X values per radio interface/station. The value of X is configurable.

For illustration purpose, some examples for KPIs calculation are provided below; however, it should be appreciated that other KPIs may be obtained by the perception function 220 in some embodiments based on needs.

In some embodiments, channel utilization of a channel assigned to the dth radio interface in the WMN may be calculated as below:

$$u_d = \frac{CBtime_2 - CBtime_1}{t_2 - t_1} \times 100 \; [\%] \quad (1)$$

where $CBtime_2$ and $CBtime_1$ denote channel busy time at time instants $t_2$ and $t_1$, respectively. The channel busy time may be defined as the total time duration (in milliseconds) where a channel busy status between predefined beacon intervals is observed by a carrier sense mechanism.

Alternatively or in addition, in some embodiments, an activity factor of the dth radio interface may be obtained, for example as below:

$$a_d = \frac{(CTXtime_2 + CRXtime_2) - (CTXtime_1 + CRXtime_1)}{t_2 - t_1} \times 100 \; [\%] \quad (2)$$

where $CTXtime_2$ and $CTXtime_1$ denote channel transmitting (Tx) time at time instants $t_2$ and $t_1$, respectively, and $CRXtime_2$ and $CRXtime_1$ denote channel receiving (Rx) time at time instants $t_2$ and $t_1$, respectively. The channel Tx time is defined as the total time duration (in milliseconds) that the radio interface d has spent on transmitting data, whereas the channel Rx time is defined as the total time duration (in milliseconds) that the radio d has spent on receiving data.

Another KPI that may be obtained by the perception function 220 is a retry rate per station. As an example, the retry rate for the kth station (i.e., the kth terminal device) in the WMN may be calculated based on station statistic data via the following equation (3):

$$\Delta_{retries,k} = \frac{N_{retries,k}(t_2) - N_{retries,k}(t_1)}{(N_{packets,k}(t_2) + N_{retries,k}(t_2)) - (N_{packets,k}(t_1) + N_{retries,k}(t_1))} \times 100 \; [\%] \quad (3)$$

where $N_{retries,k}(t_2)$ and $N_{retries,k}(t_1)$ N stand for the total number of retries for the k-th STA at time instants $t_2$ and $t_1$, respectively, while $N_{packets,k}(t_2)$ and $N_{packets,k}(t_1)$ stand for the total number of packets transmitted out of the radio interface for the k-th STA at time instants $t_2$ and $t_1$ respectively.

In some embodiments, the perception function 220 may calculate an error rate per station k based on station statistic data, for example, as below:

$$\Delta_{errors,k} = \frac{N_{errors,k}(t_2) - N_{errors,k}(t_1)}{N_{packets,k}(t_2) - N_{packets,k}(t_1)} \times 100 \; [\%] \quad (4)$$

where $N_{errors,k}(t_2)$ and $N_{errors,k}(t_1)$ stand for the total number of inbound failed packets for k-th STA at time instants $t_2$ and $t_1$, respectively.

A RSSI for the k-th station may also be obtained by the perception function 220 as a KPI. The RSSI presents measured received signal strength in dBm of beacon frames received on a channel, and may be defined as dot11BeaconRssi. The RSSI may be measured during reception of a physical (PHY) preamble, and its value may be forwarded to the medium access control (MAC) layer in the RXVECTOR. Therefore, it may be already available in the sensing information. Or in other words, the RSSI may be extracted from the sensing information directly. A valid range of the RSSI value may be from −100 dBm to 40 dBm.

Another example for the KPI obtained by the perception function 220 may be an end to end (E2E) User Goodput. The E2E User Goodput $R_k$ for the kth station may be defined as a result of the number of good bytes transmitted divided by the amount of time required to transmit these bytes, i.e., $$R_k = \frac{(TXBytes(t_2) + RXBytes(t_2)) - (TXBytes(t_1) + RXBytes(t_1))}{t_2 - t_1} \times \frac{8}{1024 * 1024} \; [Mbps] \quad (5)$$

where $TXBytes(t_2)$ and $RXBytes(t_2)$ denote the total number of bytes transmitted out of the radio interface of the station k and the total number of bytes received on the radio interface at time instant $t_2$, respectively; likewise, $TXBytes(t_1)$ and $RXBytes(t_1)$ denote the total number of bytes transmitted out of the radio interface of the station k and the total number of bytes received on the radio interface at time instant $t_1$, respectively.

The perception function 220 in FIG. 2 may further detect problems in the WMN based on the current KPIs values obtained. The problem detection may be performed for each active radio interface in the WMN and an output of the problem detection may be an updated problem object assigned to each active radio and a total number of detected problems (for all active radios). Properties of the problem object may present one or more arguments to which certain values are assigned. For illustration rather than limitation, the problem object for the radio d may have one or more of the properties of: average channel utilization, the number of terminal devices associated with the radio d, the number of MPs associated with the radio d, the number of terminal devices associated with a poor RSSI, the number of MPs associated with a poor RSSI, the number of terminal devices that are associated with a good RSSI but encounter a problem (e.g., a high error rate or retry rate), and the number of associated MPs that are associated with a good RSSI but encounter a problem. Details of these properties will be described below.

The average channel utilization may be determined as a mean value of X corrected channel utilizations values kept by the perception function 220 for a radio interface. If the average channel utilization of the radio d is higher than a utilization threshold (which may be denoted as CH_UTI-LIZATION_THR), the perception function 220 may determine that a problem occurs, and increase the number of problems (which may be denoted as NBR_PROBLEMS) by 1. Note that the utilization threshold may be defined adaptively per channel survey for each WMN and each band. Likewise, an average activity factor may be calculated as a mean value of X kept activity factor values.

The number of terminal devices associated with the radio d indicates the number of active terminal devices (stations, which are not MP) associated with the radio d. A terminal device is labeled as active if its average E2E user goodput is higher than a predetermined threshold which may be denoted as ACTIVE_STATION_LOAD_THR.

Likewise, the number of MPs associated with the radio d indicates the number of active extenders (MPs) associated with the radio d. An MP is labeled as active if its average E2E goodput is higher than the predetermined threshold ACTIVE_STATION_LOAD_THR.

The perception function 220 may determine the number of terminal devices associated with a poor RSSI by checking for each terminal device associated with the radio d whether its average RSSI is less than a RSSI threshold (which may be denoted as RSSI_DOWN_THR). If this condition is satisfied (i.e., average RSSI is less than RSSI_DOWN_THR), the perception function 220 may determine that a problem occurs and then increase the number of problems (e.g., the NBR_PROBLEMS counter) by 1.

Likewise, the perception function 220 may determine the number of MPs associated with a poor RSSI by checking for each MP associated with the radio d whether its average RSSI is less than the RSSI threshold RSSI_DOWN_THR. If the average RSSI for a MP (extender) associated with the radio d is less than RSSI_DOWN_THR, the NBR_PROB-LEMS counter is increased by 1 as well.

To determine the number of terminal devices (or MPs) that are associated with a good RSSI but encounter a problem (e.g., a high error rate or retry rate), the perception function 220 may check, for each active terminal device (or MP), whether an average RSSI for the terminal device (or MP) is higher than the RSSI threshold RSSI_DOWN_THR, and at the same time its average error rate is higher than an error threshold (e.g., ERROR_THR AND) and its average retries rate is higher than a retry threshold (which may be denoted as RETRIES_THR). In response to all these conditions being satisfied, the perception function 220 increases the number of the problems (i.e., the NBR_PROBLEMS counter) by 1 as well.

If problems are detected, i.e., a value of NBR_PROB-LEMS is higher than 0, the perception function 220 may send a signal to the reasoning function 240 to evaluate the current state in the WMN.

The reasoning function 240 in FIG. 2 may determine a priority for solving each of the detected network problems, and determine, according to the determined priority, a mapping between a detected problem and an optimization strategy candidate to be executed by a MP for solving the detected network problem. For example rather than limitation, the reasoning function 240 may rank MPs based on the total (Tx and Rx) traffic load of each associated radio interfaces for each of the MPs. The MP with the highest rank may be determined as the first one on the list for problem solving. It should be appreciated that the priority for the problems (or associated MPs) may be determined in any suitable manner, and embodiments of the present disclosure are not limited to any specific way for determining the priority.

Upon determining a problem to be solved based on the priority, the reasoning function 240 in FIG. 2 may build a mapping between the problem to an optimization strategy candidate. This task of the reasoning function 240 may be implemented as a function which accepts a MP associated with the problem to be solved as an input and returns a Boolean value which indicates whether a potential optimization strategy that can solve the problem assigned to the radio of MP is available. If the returned value is false, the reasoning function 240 may skip this MP and continue to check next MP with the highest rank after excluding already checked MPs. If the returned value is true, the reasoning function 240 may stop the checking and calls an optimization method/strategy corresponding to the given problem.

The reasoning function 240 may express the current network problem in a form of an argument, and build a mapping rule. As an example, the mapping rule may be built based on expert's domain knowledge which may be stored into the KB 270 in FIG. 2.

In some embodiments, the reasoning function 240 may determine an optimization strategy for a given problem based on a reward value obtained by the learning function 230 for the problem (argument) and a potential optimization strategy, i.e., a reward for the couple (argument, optimization strategy). For example, the reasoning function 240 may select an optimization strategy which results in the highest reward for the couple (argument, optimization strategy).

The learning function 230 may determine/update the reward for each (argument, optimization strategy) by employing different learning methods, such as supervised, semi-supervised, unsupervised learning or reinforcement learning. Embodiments of the present disclosure are not limited to any specific methods for determining the reward each pair of (argument, optimization strategy). Just for illustration, a reinforcement learning may be used, where a Q-value is assigned to each couple of (argument, optimization strategy) as a reward. Alternatively, in some embodiments, the reward may be modelled as a sum of End-to-End (E2E) user throughput, or other Quality of Experience (QoE)

metrics. By determining the reward, the learning function 230 gets insight into how good a problem-to-optimization mapping is.

Upon finding an optimization strategy for a given problem, for example based on the reward, the reasoning function 240 calls an optimization algorithm included in the optimization function 250 to determine an optimized action to be executed for solving the given problem.

The optimization function 250 includes independent and/or joint optimization algorithms, such as channel and bandwidth optimization, load-balancing, roaming, power control etc. Each optimization algorithm/strategy may be designed to accept only an identifier of a MP and a radio interface for which a problem is observed as input and to return an optimized action providing the highest probability to solve the problems for the radio interface of the MP, if exists. In case that such an optimized action doesn't exist, the optimization function 250 may notify the reasoning function 240 that no action is available for solving the detected problem. In some embodiments, each optimization algorithm has an access to the Knowledge Base 270 which it can leverage to find the optimal action for a given problem. If the optimized action is found, the optimization function 250 may cause the action to be executed by a corresponding MP directly or forward it to the decision making function 260.

For instance, in the WMN, if there are a few terminal devices using channel 1 with good RSSI but high error rate and high retransmission rate, a problem may be detected by the perception function 220, and then the reasoning function 240 may map the problem to an optimization strategy, for example, channel optimization. Then the optimization function 250 may determine an optimized action for the problem, for example, changing current channel 1 to a different channel 11.

Optionally, the decision making function 260 evaluates the optimized action output from the optimization function 250 and decides whether it is worth to apply it in the WMN based on one or more predetermined policies. The decision making function 260 may contain different policies each of which may be specific for an optimization strategy. For example, there may be a policy for channel optimization, a policy for topology optimization, and a policy for roaming etc. In other words, there may be a specific policy for each optimization strategy for evaluating whether an optimized action should be applied.

As an example rather than limitation, a policy for channel optimization may require that if a previous reward of a new channel (e.g., channel 11) is not higher than 115% of current reward of current applied channel (e.g., channel 1), then the optimized action requiring changing the current channel to the new channel is not worth to be applied.

If an optimized action output from the optimization function 250 is determined to be worth to apply, it will be forwarded by the decision making function 260 to the action optimizer 280 for applying to a MP, and iteration for the problem stops. In case that the optimized action is not worth to apply, the decision making function 260 may notify the reasoning function 240 to find another optimization strategy for solving this problem and the iteration for the problems continues.

The action optimizer 280 is responsible for applying a determined optimization action in the WMN while maintaining the network connectivity for each MP (i.e. each MP can reach the MG). The action optimizer 280 may apply the determined optimization action by communicating with agents which are running at an MP. The agents are action executors and they know how to apply each action at their radio interfaces or to associated terminal devices/MPs. The action optimizer 280 may indicate a request with details of an optimization action to an agent, and the agent executes the optimization action according to the request.

In some embodiments, to keep the gained network knowledge in the long-run, network data and the expert's domain knowledge may be stored in the KB 270. Data stored in the KB 270 may be classified into three types, i.e., Short-Term Memory (STM), Long-Term Memory (LTM) and Action Buffer Memory (ABM).

The STM may include the key performance indicators (KPIs) values which are the output of perception function 220. These data may be retained periodically (e.g. each hour) in the database, and outdated entries may be deleted from the KB 270. These data may be utilized to calculate rewards for determining a problem-optimization mapping. These data may also be leveraged by the optimization function 250 to find an optimized action for a certain network problem.

The LTM may include static knowledge composed of facts and strict rules which remain static over a period of time. This knowledge may be represented in the form of arguments. Arguments are used to describe network problems as a vector of network QoS data (e.g., KPIs and its value). Arguments may be classified based on experts' domain knowledge.

The ABM may include a set of optimization strategies. As discussed above, for each couple (argument, optimization strategy), a reward may be assigned. In some embodiments, one or more arguments' classes may be assigned to each optimization strategy based on experts' domain knowledge. Or in other words, an optimization strategy may be mapped to one or more arguments (problem) classes. If a certain optimization strategy cannot be classified to any of the classes initially, then it may be assigned all classes. Then a best mapping for the optimization strategy may be found by the leaning function 230 based on a reward calculated.

The proposed framework of the intelligent controller treats jointly all optimization algorithms, and for a certain problem in the network, it selects an optimization candidate which has the highest likelihood to solve the network problem with minimal cost.

Figure 3:
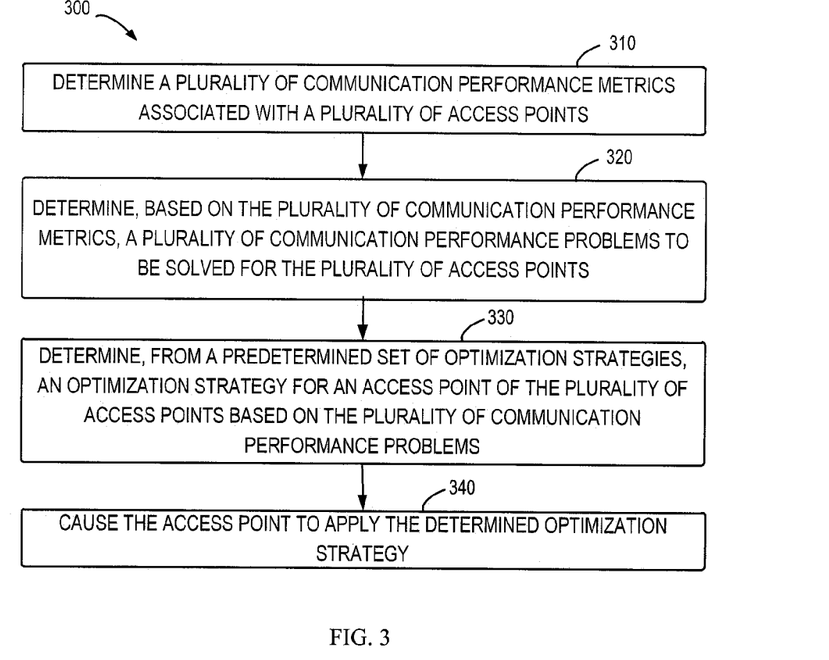
FIG. 3 shows a flowchart of a method for network optimization according to an embodiment of the present disclosure.

FIG. 3 shows a flowchart of a method 300 for network optimization in a wireless network, for example the WMN 100 in FIG. 1. The method 300 may be implemented by a network device, for example, the MG 101 shown in FIG. 1. However, it should be appreciated that the method 300 may also be implemented in another network node or in a cloud. Or, operations of method 300 may be implemented by a plurality of apparatuses in a distributed way. Just for ease of discussion, the method 300 will be described below with reference to MG 101 and the wireless network 100 illustrated in FIG. 1. However, embodiments of the present disclosure are not limited thereto.

As shown in FIG. 3, at block 310, MG 101 determines a plurality of communication performance metrics associated with a plurality of access points, for example MPs 102 in FIG. 1. In some embodiments, the MG 101 may determine a communication performance metric for each of active radio interface and active stations (for example terminal devices 103 in FIG. 1) associated with the plurality of MP 102, based on raw network data obtained from the plurality of MPs via sensing.

In some embodiments, the raw network data may be obtained by a sensing function of the MG 101, as described with reference to FIG. 2. The raw network data may include radio-interface level metrics for each of the active radio interfaces associated with the plurality of access points, and station level statistics for each of the active stations associated with the plurality of access points.

For illustration rather than limitation, the radio-interface level metrics may include one of more of: information about each logical radio interface (such as a service set identifier (SSID or BSSID), a assigned channel index, a channel bandwidth, a type of a backhaul, a role of an associated MP), and statistic information of a channel (such as Clear Channel Assessment (CCA) statistics counters for currently used channels, e.g., channel busy time, channel transmitted time, channel received time, etc.).

In some embodiments, the station level statistics may include one of more of: total number of packets received, total number of packets transmitted, total amount of data transmitted or received, total number of retries, total number of failed packets, received signal strength indicator and a media access control address, etc.

In some embodiments, at block 310, the MG 101 may determine a plurality of key performance indicators (KPIs) including one or more of the following: channel utilization, an activity factor, a retry rate, a packet error rate, a received signal strength indicator (RSSI), and an end to end (E2E) user goodput. For example, each of these KPIs may be determined based on two successive sensing results. In some embodiments, one or more of the Equations (1)-(5) may be used for obtaining the KPIs by the MG 101.

At block 320, based on the plurality of communication performance metrics (e.g., KPIs), the MG 101 determines a plurality of communication performance problems to be solved for the plurality of MPs. In some embodiments, the plurality of communication performance problems to be solved for the plurality of MPs based on one or more of the following: average channel utilization, the number of active terminal devices associated with a radio interface, the number of active MPs associated with a radio interface, the number of terminal devices associated with a poor RSSI, the number of MPs associated with a poor RSSI, the number of terminal devices and/or MPs associated with a good RSSI, a high error rate and a high retry rate. In some embodiments, the problem may be determined by a perception function (such as the perception function 220) included in the MG 101. Therefore, descriptions related to the problem detection provided with reference to the perception function 220 also apply here.

As an example rather than limitation, if the average channel utilization is higher than a predetermined utilization threshold (e.g., CH_UTILIZATION_THR), the MG 101 may determine that a communication performance problem occurs and may increase the number of detected communication performance problem by 1.

Alternatively or in addition, the MG 101 may increase the number of detected communication performance problem by 1, when an average RSSI associated with a terminal device or MP is lower than a predetermined strength threshold (e.g., RSSI_DOWN_THR).

In some embodiments, the MG 101 may increase the number of detected communication performance problem by 1, if an average RSSI associated with a terminal device or MP is higher than the predetermined strength threshold (e.g., RSSI_DOWN_THR), an average error rate associated with the terminal device or the MP is higher than a predetermined rate threshold (e.g., ERROR_THR) and an average retry rate associated with the terminal device or the MP is higher than a predetermined retry threshold (e.g., RETRIES_THR).

At block 330, the MG 101 determines, from a predetermined set of optimization strategies, an optimization strategy for an MP of the plurality of MPs based on the plurality of communication performance problems determined at block 320. For example rather than limitation, the predetermined set of optimization strategies may be stored in a database, e.g., the KB 270 in FIG. 2.

Figure 4:
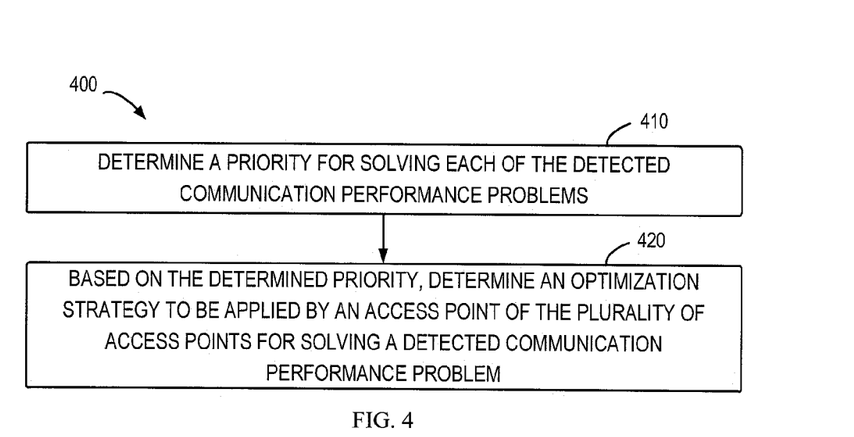
FIGS. 4 and 5 show example implementations for determining an optimization strategy for solving a communication performance problem according to embodiments of the present disclosure.

FIG. 4 shows example operations 400 that may be performed at block 330. In this example, MG 101 may determine a priority for solving each of the detected communication performance problems at block 410; and at block 420, based on the determined priority, MG 101 determines an optimization strategy to be applied by an MP of the plurality of MPs for solving a detected communication performance problem. That is, at block 420, the MG 101 may first determine an optimization strategy for solving a problem which has the highest priority.

For illustration rather than limitation, at block 410, MG 101 may ranking the plurality of MPs based on total (including transmitting and receiving) traffic load associated with each of the MPs, and determine the priority for solving a communication performance problem based on the ranking of the plurality of access points. For instance, MG 101 may determine that a communication performance problem associated with an MP with the highest rank is the communication performance problem to be solved with the highest priority. In some embodiments, the priority may be determined by a reasoning function (such as the reasoning function 240 in FIG. 2) included in the MG 101. Therefore, related descriptions provided with reference to the reasoning function 240 also apply here.

Figure 5:
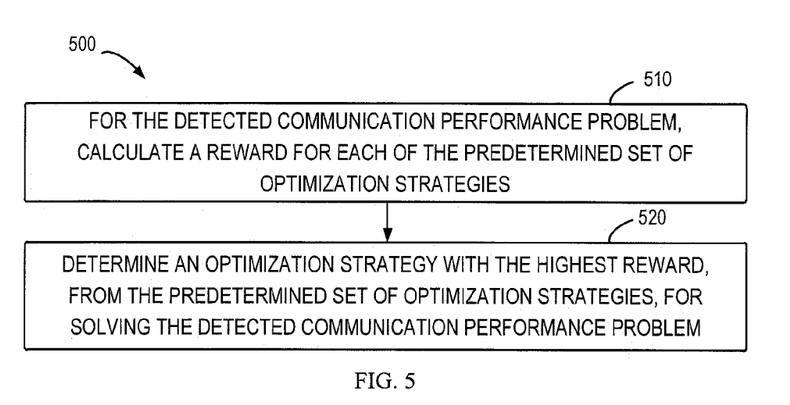

Now still referring to FIG. 3. In some embodiments, at block 330, MG 101 may determine an optimization strategy for a detected communication performance problem based on a predetermined criterion. FIG. 5 shows an example implementation 500 of block 330.

In this example, at block 510, for a given communication performance problem (which may be determined based on a priority as described with reference to FIG. 4), the MG 101 may calculate a reward for each of the predetermined set of optimization strategies (e.g., channel reselection; roaming, etc.). For illustration rather than limitation, the reward may be in a form of a Q function or a sum of E2E user goodput. In some embodiments, each communication performance problem may be expressed in a form of an argument, and in such a case, a reward may be calculated for each pair of (argument, optimization strategy), as described with reference to FIG. 2.

At block 520, MG 101 determines an optimization strategy (e.g., channel selection) with the highest reward, from the predetermined set of optimization strategies which may be obtained from the KB 270, for solving the given communication performance problem.

Note that the operations in blocks 510-520 of FIG. 5 may be performed by a reasoning function (for example the reasoning function 240 in FIG. 2) in the MG 101. Therefore, related descriptions provided above with reference to the reasoning function 240 also apply here.

Figure 6:
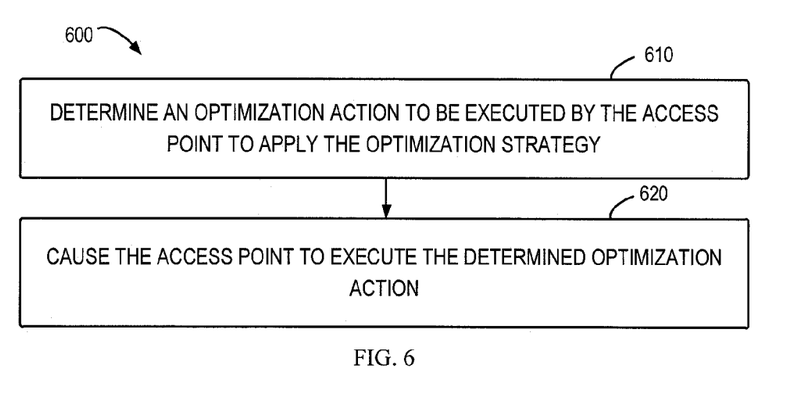
FIGS. 6 and 7 show example implementations for applying an optimization action to an access point according to embodiments of the present disclosure.

Now referring back to FIG. 3. At block 340, MG 101 causes a corresponding MP associated with the given communication performance problem to apply the optimization strategy determined at block 330. FIG. 6 shows example operations 600 which may be implemented at block 340. In this example, at block 610, the MG 101 may determine an optimization action to be executed by the corresponding MP to apply the optimization strategy, and causes the access point to execute the determined optimization action at block

620. For instance, the determined optimization strategy may be channel (re)selection, and in such a case, at block 610, the MG 101 may determine which channel to reselect for the corresponding MP, based on any proper optimization algorithm. If the MG determines to reselect a channel with index 11 to replace the current channel 1 for the corresponding MP, the optimization action output from block 610 would be: changing current 1 to channel 11 for the MP.

Note that, in some embodiments, the operation in block 610 for determining an optimization action may be performed, for example, by an optimization function in the MG 101, such as the optimization function 250 shown in FIG. 2, and therefore related descriptions provided with reference to optimization function 250 also apply here.

In some embodiments, at block 620, the MG 101 may trigger a corresponding MP to execute the determined optimization action directly, e.g., by sending a command with details of the optimization action to the MP.

Figure 7:
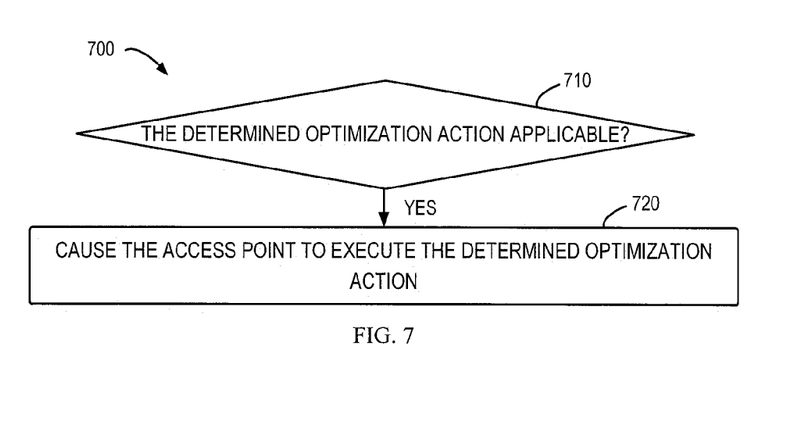

Alternatively, in some embodiments, the MG 101 may further check applicability of the determined optimization action before causing the optimization action to be applied/executed. In an example implementation 700 shown in FIG. 7, only when the MG 101 determines at block 710 that the optimization action is applicable, it causes the MP to execute the determined optimization action at block 720.

On the other hand, if the optimization action is evaluated as inapplicable, the MG 101 may determine another optimization strategy for the MP for solving the communication performance problem, e.g., by performing block 330 of FIG. 3 again.

Figure 8:
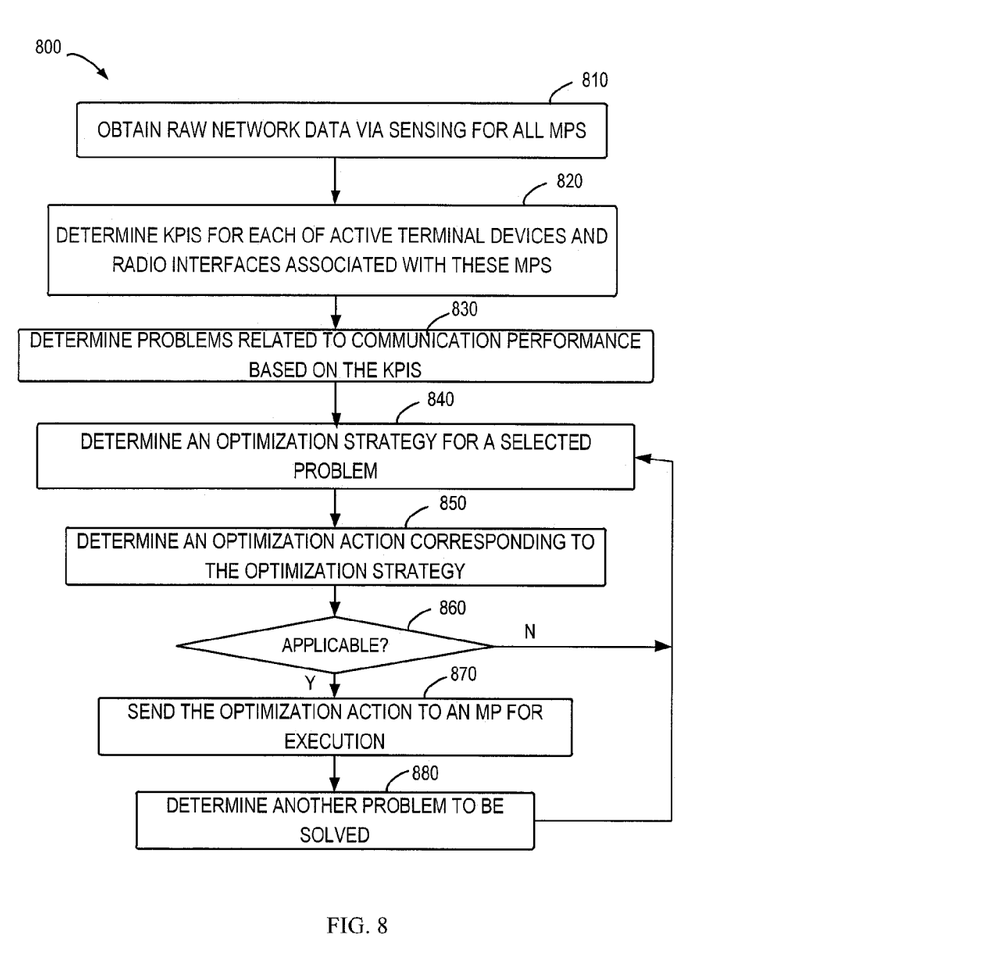
FIG. 8 shows a flowchart of another method with iteration for network optimization according to an embodiment of the present disclosure.

That is to say, operations may be performed iteratively to determine a proper optimization action for a problem. FIG. 8 shows an example method 800 with iteration. The method 800 may be performed by a network device (e.g., MG 101 in FIG. 1), or in a cloud.

As shown in FIG. 8, at block 810, raw network data for all MPs in the WMN are obtained via sensing, and then at block 820 KPIs are determined for each active terminal devices and radio interfaces associated with these MPs, based on the collected raw network data. At block 830, one or more problems related to communication performance are detected based on the KPIs, and at block 840, an optimization strategy is determined for a problem which may be selected from the detected problems based on priority. At block 850, an optimization action corresponding to the optimization strategy is determined. At block 860, applicability of the optimization action is evaluated. If the optimization action is applicable, it is send to an MP for execution at block 870. Then next problem to be solved is determined at block 880, for example based on priority. The procedure then returns back to block 840 to solve the next problem. On the other hand, if the optimization action is inapplicable, the procedure may return back to block 840 directly to find another optimization strategy for current problem.

In some embodiments, a network device which may perform method 300 or 800 for network optimization is provided. The network device may include an intelligent controller, e.g., the intelligent controller 202 in FIG. 2.

At the access point (e.g., an MP), an agent which communicates with the intelligent controller for network optimization may be included. Note that in some embodiments, an MG may be considered as a special MP, and therefore, the MG may also include the agent.

Figure 9:
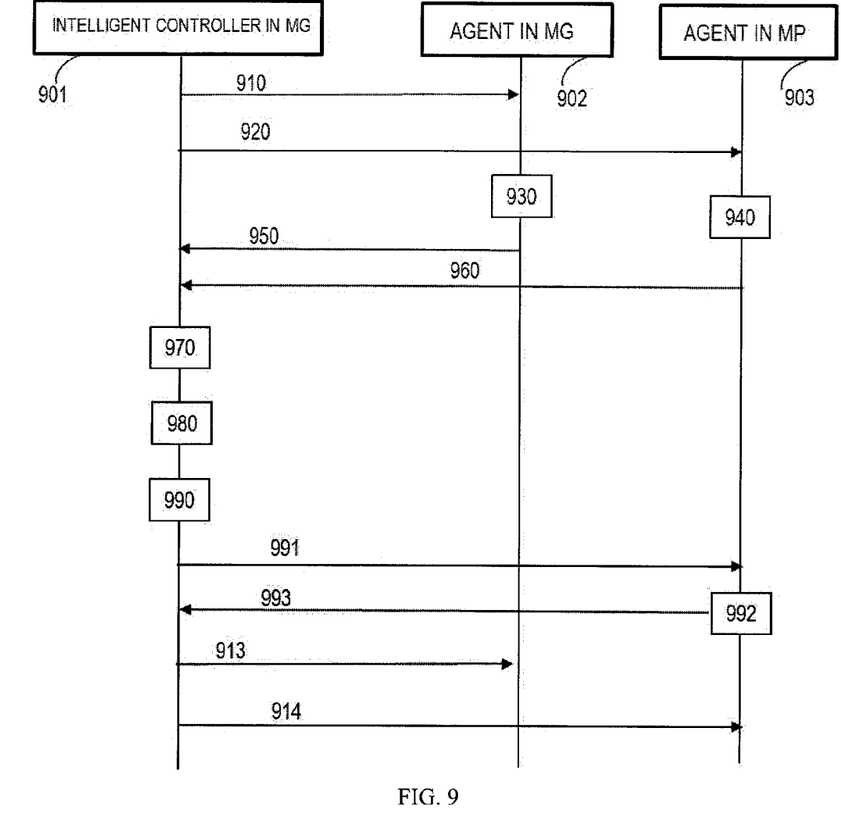
FIG. 9 shows a signaling procedure for network optimization according to an embodiment of the present disclosure.

An example of message flows 900 between an intelligent controller 901 and agents 902 and 903 included in an MG and an MP when the intelligent controller 901 is running on the MG is given in FIG. 9. In this example, the MG includes both the Agent 902 and the Intelligent Controller 901. For this message flow we assume that the MP has a problem which needed to be fixed.

As shown in FIG. 9, the intelligent controller 901 sends (910, 920) a sensing request to the agent 902 and 903 respectively. The agents 902 and 903 call (930, 940) system sensing respectively, and send (950, 960) sensing results to the intelligent controller 901. Based on the sensing results, the intelligent controller 901 calculates KPIs and detects (970) problems. Then the intelligent controller 901 prioritize (980) the detected problems. Assume in this example that a problem associated with the MP in FIG. 9 is determined to be solved with the highest priority, and the intelligent controller 901 finds the best optimization strategy candidate for the problem. For example, the intelligent controller 901 may treat all optimization algorithms/strategies jointly, and, for the problem, it selects an optimization strategy which has the highest likelihood to solve the network problem with minimal cost. Then, the best optimization action is determined (990) for the MP to apply the optimization strategy. The intelligent controller triggers (991) the agent 903 in the MP to execute the optimization action to fix the problem via a command. The agent 903 in the MP executes (992) the optimization action according to the command, and may send (993) an acknowledgement (ACK) to the intelligent controller 901. Note that the intelligent controller 901 may perform the above problem detecting and solving procedure periodically or based on an event. For example, after a predetermined time period, the intelligent 901 may send (913, 914) new sensing requests to the agents 902 and 903 again to initiate a new iteration.

In some embodiments, an apparatus which may be implemented in/as a network device, e.g., the MG 101 in FIG. 1, is provided. The apparatus may be used for network optimization and comprises: means for determining a plurality of communication performance metrics associated with a plurality of access points; means for determining, based on the plurality of communication performance metrics, a plurality of communication performance problems to be solved for the plurality of access points; means for determining an optimization strategy for an access point of the plurality of access points based on the plurality of communication performance problems, from a predetermined set of optimization strategies; and means for causing the access point to apply the determined optimization strategy.

In some embodiments, an apparatus may use network data and expert's domain knowledge to find the best optimization strategy to solve a given problem in WMN with minimal cost.

Figure 10:
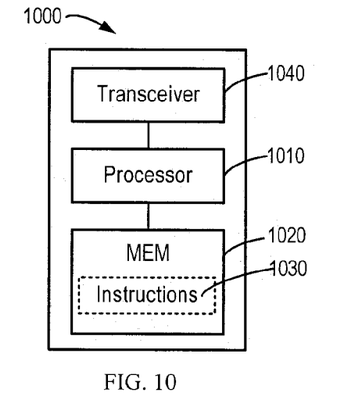
FIG. 10 illustrates a simplified block diagram of an apparatus that may be embodied as/in a network device.

FIG. 10 illustrates a simplified block diagram of another apparatus 1000 that may be embodied in/as a network device, for example, MG 101 shown in FIG. 1.

As shown by the example of FIG. 10, apparatus 1000 comprises a processor 1010 which controls operations and functions of apparatus 1000. For example, in some embodiments, the processor 1010 may implement various operations by means of instructions 1030 stored in a memory 1020 coupled thereto. The memory 1020 may be any suitable type adapted to local technical environment and may be implemented using any suitable data storage technology, such as semiconductor based memory terminal devices, magnetic memory terminal devices and systems, optical memory terminal devices and systems, fixed memory and removable memory, as non-limiting examples. Though only one memory unit is shown in FIG. 10, a plurality of physically different memory units may exist in apparatus 1000.

The processor 1010 may be any proper type adapted to local technical environment, and may include one or more of general purpose computers, special purpose computers, microprocessors, digital signal processors DSPs and processors based on multicore processor architecture, as non-limiting examples. The apparatus 1000 may also comprise a plurality of processors 1010.

The processors 1010 may also be coupled with a transceiver 1040 which enables reception and transmission of information. For example, the processor 1010 and the memory 1020 may operate in cooperation to implement any of the methods 300 or 800 described with reference to FIGS. 3-8. It shall be appreciated that all the features described above with reference to FIGS. 2-8 also apply to apparatus 1000, and therefore will not be detailed here.

Various embodiments of the present disclosure may be implemented by a computer program or a computer program product executable by one or more of the processors (for example processor 1010 in FIG. 10), software, firmware, hardware or in a combination thereof.

Although some of the above description is made in the context of a communication network shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram 1030 in FIG. 10). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

The techniques described herein may be implemented by various means so that an apparatus implementing one or more functions of a corresponding apparatus described with an embodiment comprises not only prior art means, but also means for implementing the one or more functions of the corresponding apparatus and it may comprise separate means for each separate function, or means that may be configured to perform two or more functions. For example, these techniques may be implemented in hardware (e.g., circuit or a processor), firmware, software, or combinations thereof. For a firmware or software, implementation may be made through modules (e.g., procedures, functions, and so on) that perform the functions described herein.

Some example embodiments herein have been described above with reference to block diagrams and flowchart illustrations of methods and apparatuses. It will be appreciated that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept may be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, comprising:
    determining a plurality of communication performance metrics associated with a plurality of access points of a wireless mesh network, comprising determining a communication performance metric for each of active radio interfaces and active stations associated with the plurality of access points, based on raw network data obtained from the plurality of access points via sensing;
    determining, based on the plurality of communication performance metrics, a plurality of communication performance problems to be solved for the plurality of access points;
    determining an optimization strategy for an access point of the plurality of access points based on the plurality of communication performance problems, from a predetermined set of optimization strategies, comprising determining a priority for solving a communication performance problem based on ranking of the plurality of access points,
    wherein the ranking of the plurality of access points being determined based on total traffic load associated with each of the plurality of access points, and determining a communication performance problem associated with an access point of the plurality of access points with a highest rank as a communication performance problem to be solved with a highest priority; and
    applying the determined optimization strategy at the access point for solving the plurality of communication performance problems.

2. The method of claim 1, wherein the raw network data includes radio-interface level metrics for each of the active radio interfaces associated with the plurality of access points, and station level statistics for each of the active stations associated with the plurality of access points.

3. The method of claim 2, wherein the radio-interface level metrics include one of more of: a service set identifier, a channel index, a channel bandwidth, a type of a backhaul, a role of an associated access point, and statistic information of a channel.

4. The method of claim 2, wherein the station level statistics include one of more of: total number of packets received, total number of packets transmitted, total amount of data transmitted or received, total number of retries, total number of failed packets, a received signal strength indicator and a media access control address.

5. The method of claim 1, wherein the optimization strategy comprises strategies for optimization of at least one of channel, routing, roaming, band-steering, or location optimization at the access point.

6. The method of claim 1, wherein apply the determined optimization strategy at the access point the network device is performed while maintaining network connectivity for each other access point of the plurality of access points.

7. A network device, comprising:
 at least one processor; and
 at least one non-transitory memory including computer program codes;
 the at least one memory and the computer program codes are configured to, with the at least one processor, cause the network device at least to:
 determine a plurality of communication performance metrics associated with a plurality of access points of a wireless mesh network, comprising determining a communication performance metric for each of active radio interfaces and active stations associated with the plurality of access points, based on raw network data obtained from the plurality of access points via sensing;
 determine, based on the plurality of communication performance metrics, a plurality of communication performance problems to be solved for the plurality of access points;
 determine an optimization strategy for an access point of the plurality of access points based on the plurality of communication performance problems, from a predetermined set of optimization strategies, comprising determining a priority for solving a communication performance problem based on ranking of the plurality of access points,
 wherein the ranking of the plurality of access points being determined based on total traffic load associated with each of the plurality of access points, and determining a communication performance problem associated with an access point of the plurality of access points with a highest rank as a communication performance problem to be solved with a highest priority; and
 apply the determined optimization strategy at the access point for solving the plurality of communication performance problems.

8. The network device of claim 7, wherein the raw network data includes radio-interface level metrics for each of the active radio interfaces associated with the plurality of access points, and station level statistics for each of the active stations associated with the plurality of access points.

9. The network device of claim 8, wherein the radio-interface level metrics include one of more of: a service set identifier, a channel index, a channel bandwidth, a type of a backhaul, a role of an associated access point, and statistic information of a channel.

10. The network device claim 8, wherein the station level statistics include one of more of: total number of packets received, total number of packets transmitted, total amount of data transmitted or received, total number of retries, total number of failed packets, a received signal strength indicator and a media access control address.

11. The network device of claim 7, wherein the optimization strategy comprises strategies for optimization of at least one of channel, routing, roaming, band-steering, or location optimization at the access point.

12. The network device of claim 7, wherein apply the determined optimization strategy at the access point the network device is performed while maintaining network connectivity for each other access point of the plurality of access points.

* * * * *

UNITED STATES PATENT AND TRADEMARK OFFICE
CERTIFICATE OF CORRECTION

| | | |
|---|---|---|
| PATENT NO. | : 11,576,055 B2 | Page 1 of 1 |
| APPLICATION NO. | : 17/253903 | |
| DATED | : February 7, 2023 | |
| INVENTOR(S) | : Erma Perenda and Haris Gacanin | |

It is certified that error appears in the above-identified patent and that said Letters Patent is hereby corrected as shown below:

On the Title Page

Item (73), Assignees:
Delete "Nokia Shanghai Bell Co., Ltd., Shanghai (CN)"

Signed and Sealed this
Tenth Day of September, 2024

Katherine Kelly Vidal
*Director of the United States Patent and Trademark Office*